United States Patent
Vogel (10) Patent No.: US 9,671,605 B2
(45) Date of Patent: Jun. 6, 2017

(54) ROD LENS, ENDOSCOPE AND METHOD FOR ASSEMBLING AN OPTICAL SYSTEM OF AN ENDOSCOPE

(71) Applicant: Karl Storz GmbH & Co. KG, Tuttlingen (DE)

(72) Inventor: Walter Vogel, Tuttlingen (DE)

(73) Assignee: Karl Storz GmbH & Co. KG, Tuttlingen (DE)

( * ) Notice: Subject to any disclaimer, the term of this patent is extended or adjusted under 35 U.S.C. 154(b) by 28 days.

(21) Appl. No.: 14/280,165

(22) Filed: May 16, 2014

(65) Prior Publication Data
US 2014/0340743 A1 Nov. 20, 2014

(30) Foreign Application Priority Data
May 17, 2013 (DE) .................. 10 2013 105 085

(51) Int. Cl.
G02B 23/24 (2006.01)
G02B 3/06 (2006.01)
G02B 3/00 (2006.01)
G02B 7/02 (2006.01)

(52) U.S. Cl.
CPC .......... *G02B 23/2446* (2013.01); *G02B 3/00* (2013.01); *G02B 3/06* (2013.01); *G02B 7/02* (2013.01); *G02B 23/243* (2013.01); *Y10T 29/49826* (2015.01)

(58) Field of Classification Search
CPC ........ G02B 23/2446; G02B 3/00; G02B 3/06; G02B 7/02; G02B 23/243; G02B 23/24; G02B 23/2423; G02B 23/26; G02B 23/2453; G02B 23/2461; G02B 23/2469; G02B 7/025; G02B 23/2407; Y10T 29/49826; A61B 1/0011; A61B 1/002; A61B 1/00188; A61B 1/00158; A61B 1/0016; A61B 1/055; H02K 41/031; H02K 1/2713; Y10S 600/92

USPC .............. 359/35, 710, 8, 809, 81, 503, 754, 359/434–435, 824; 600/101, 160, 166, 600/173, 138, 920; 29/428; 318/631; 310/12.04, 14; 385/33–34
See application file for complete search history.

(56) References Cited

U.S. PATENT DOCUMENTS

| | | | |
|---|---|---|---|
| 4,148,551 A | | 4/1979 | MacAnally |
| 4,378,952 A | * | 4/1983 | Siegmund ............ G02B 6/4206 359/557 |
| 2004/0252386 A1 | * | 12/2004 | Lei .................................. 359/754 |
| 2007/0219414 A1 | * | 9/2007 | Lei .................................. 600/173 |

(Continued)

FOREIGN PATENT DOCUMENTS

| DE | 19742454 A1 | 4/1999 |
|---|---|---|
| DE | 20201890 U1 | 6/2003 |

(Continued)

*Primary Examiner* — Scott J Sugarman
*Assistant Examiner* — Ibrahima Diedhiou
(74) *Attorney, Agent, or Firm* — Whitmyer IP Group LLC (57) ABSTRACT

A rod lens that includes a rod-shaped lens unit made of a rod-shaped lens element or a plurality of lens elements cemented to one another, wherein, on the circumferential face thereof, the lens unit includes at least one axially magnetized magnet arrangement. The invention also relates to an endoscope with a lens arrangement, which includes at least a first and, arranged adjacent to the first, a second rod lens, and to a method for assembling such an endoscope.

20 Claims, 4 Drawing Sheets

(56) References Cited

U.S. PATENT DOCUMENTS

| | | | |
|---|---|---|---|
| 2008/0183042 A1 | 7/2008 | Lederer et al. | |
| 2011/0210689 A1* | 9/2011 | Vogel | 318/631 |
| 2015/0224331 A1* | 8/2015 | Marsala | A61M 37/00 600/15 |

FOREIGN PATENT DOCUMENTS

| | | |
|---|---|---|
| DE | 102010000582 A1 | 9/2011 |
| EP | 2362529 A2 | 8/2011 |

\* cited by examiner

ROD LENS, ENDOSCOPE AND METHOD FOR ASSEMBLING AN OPTICAL SYSTEM OF AN ENDOSCOPE

FIELD OF THE INVENTION

The present invention relates to a rod lens, in particular a rod lens for an endoscope, and to an endoscope and a method for assembling an optical system of an endoscope.

BACKGROUND OF THE INVENTION

Endoscopes serve for observing cavities in human or animal bodies and in technical objects, and can have a rigid, semi-rigid or flexible embodiment. A rigid endoscope comprises an elongate endoscope shank which is suitable for insertion into a cavity to be observed, and a head that can have attachments and control elements and also an eyepiece lens. Inside the endoscope shank and the head there is arranged an optical system for transmitting an endoscopic image from the distal end of the endoscope, i.e. the end remote from the observer, to the proximal end, i.e. the end near the observer. For this purpose, the optical system comprises in particular a distally arranged objective for receiving the endoscopic image, an image carrier, and an eyepiece arranged at the proximal end of the endoscope, with an eyepiece lens for viewing the transmitted endoscopic image. The image carrier of a rigid endoscope is generally embodied as a rod lens arrangement with rod lenses arranged along an optical axis and, optionally, with further lenses. Furthermore, the endoscope can comprise illumination optical waveguides for illuminating the cavity to be observed and, optionally, further devices, such as e.g. channels for endoscopic work instruments.

Spacers, which are e.g. embodied as short cylindrical tube pieces and prevent direct contact between neighboring lenses and keep the latter at a distance from one another, are generally arranged between the lenses of the optical system. Conventionally, the rod lenses and the spacers and optional further optical elements of the rod lens arrangement are held in an optics tube of the endoscope and are freely displaceable therein due to an external diameter which is slightly smaller than the internal diameter of the optics tube. In the distal direction, the optical elements are pretensioned against a distal termination of the optics tube, which can e.g. be provided by a cover lens, by a system spring and a system termination guide. As a result of this, the lenses are, in the longitudinal direction, kept at their respective position, predetermined on the basis of the calculation of the optical system, and at a distance from one another by the spacers.

During use, endoscopes are subject to significant mechanical and thermal loads. Thus, during handling, accelerations or tremors or impacts can act on the endoscope, and these can lead to movements and dynamic loads on the lenses and the other optical components. Here, the contact regions between the spacers and the rod lenses are particularly problematic since the force exerted on the optical system by pretension and the dynamic forces generated by tremors or impacts are transmitted in these regions. The spacers generally have an embodiment with relatively thin walls in order to avoid substantial reduction in the clear diameter usable for image transmission; therefore, the contact pressure occurring in these regions is very high, particularly in the case of dynamic loads. This can create abrasion which can lead to the generation of stray light. Furthermore, spalling may occur on the faces of the lenses under load from the spacers, as a result of which the quality of the transmitted endoscopic image can be significantly impaired. This can create significant repair outlay.

In order to reduce the risk of damage to the lenses spaced apart by the spacers by the forces applied to the lenses by the spacers, the utility model specification DE 202 01 890 U1 proposes to design a spacer in respect of form or material composition in such a way that, at the contact faces between the spacer and a lens, said spacer exerts a small notch effect on lenses. To this end, the spacer has a material with a lower surface hardness or an elastic embodiment on the contact faces in order to limit the force exerted on the lens.

SUMMARY OF THE INVENTION

It is an object of the present invention to specify a rod lens, an endoscope and a method for assembling an optical system of an endoscope, wherein simple and secure assembly and a reduction in the risk of damage to the rod lenses during the assembly and during the use of the endoscope is made possible.

This object is achieved by a rod lens and endoscope according to the invention.

A rod lens comprises a rod-shaped lens unit, which consists of a single rod-shaped lens element or a plurality of lens elements cemented to one another. The rod-shaped lens unit has a longitudinal axis, wherein a length of the lens unit in the direction of the longitudinal axis is greater than a diameter measured across the longitudinal axis. The optically effective faces of the rod lens are the two end faces of the lens unit and optionally interfaces, between a plurality of lens elements, situated in the interior of a lens unit composed of a plurality of lens elements. One or more lens elements can also be embodied as a flat rod. On the external side thereof, the rod-shaped lens unit has a circumferential face. The lens unit preferably has a rotationally symmetric, in particular at least sectionally cylindrical embodiment, wherein the longitudinal axis is the axis of symmetry of the lens unit. In the case of an at least sectionally cylindrically embodied lens unit, the circumferential face is the at least sectionally cylindrical lateral face of the lens unit.

A rod lens according to the invention comprises at least one magnet arrangement magnetized in the axial direction and arranged on the circumferential face of the lens unit. Therefore, the magnet arrangement is embodied as a permanent magnet with magnetic poles pointing in the direction of the two ends of the rod lens. The magnet arrangement can comprise one or more permanent magnets. Furthermore, the rod lens can comprise one or more of such magnet arrangements. To the extent that a single magnet arrangement is present, the latter can extend over a portion of the circumferential face or substantially over the whole circumferential face of the rod lens. Within the scope of the present application, a "rod lens" is understood to mean the unit made of the rod-shaped lens element or the lens elements cemented to one another and the magnet arrangement. The rod lens according to the invention is suitable, in particular, for use in an image carrier of a rigid endoscope.

As a result of the rod lens comprising at least one permanently magnetic magnet arrangement with magnetic poles directed parallel to the longitudinal axis of the rod lens, it is possible to push the rod lens contactlessly into a desired position during the insertion into an optics tube, for example an optics tube of an endoscope, by using a magnet with a polarity directed in the corresponding opposite direction. Furthermore, this renders it possible to construct a lens system with a plurality of successive rod lenses, in which at least part of a compressive force acting in the longitudinal direction is absorbed by a magnetic repulsive force between two adjoining rod lenses. What this can render possible, in particular, is to develop a lens arrangement, displaceably held in an optics tube, with rod lenses neighboring one another with their end faces, wherein a gap remains between the end faces of the rod lenses without thus requiring mechanical spacers, which contact the rod lenses and keep these apart mechanically. As a result of not requiring mechanical spacers, it is possible to avoid a restriction of the cross section of the lens elements of the rod lens, available for transmitting the endoscopic image. Furthermore, the assembly of a lens system consisting of a plurality of rod lenses arranged in succession can be simplified and made more reliable by virtue of it being possible to embody the rod lens as a preassembled component with the at least one magnet arrangement such that a reduced number of components needs to be handled during assembly.

The magnet arrangement is securely connected to the rod-shaped lens unit of the rod lens, which is formed by a lens element or a plurality of lens elements cemented to one another; the at least one magnet arrangement is preferably adhesively bonded to the circumferential face of the lens unit. To this end, an internal face of the magnet arrangement can be embodied cylindrically or partially cylindrically with an internal diameter that is slightly larger than the external diameter of a cylindrical region of the lateral or circumferential face of the lens unit onto which the magnet arrangement is adhesively bonded such that a gap for adhesion, which is at least partly filled with an adhesive for fixing the magnet arrangement on the lens unit, remains between the internal side of the magnet arrangement and the external side of the lens unit. This can achieve fixing of the magnet arrangement on the circumferential face in a simple and secure manner.

In accordance with a preferred embodiment of the invention, the magnet arrangement only takes up a portion of the circumferential face of the rod-shaped lens unit and is arranged in an end section of the lens unit. As a result of this, a particularly effective generation of a magnetic repulsive force in relation to an adjacent rod lens with opposite polarity is made possible due to the vicinity of the magnet arrangement to the relevant end of the rod lens. Furthermore, the magnet arrangement can in this case simultaneously serve to guide the rod lens in an optics tube of an endoscope, wherein a central region of the rod lens is not in contact with the optics tube and the rod lens is therefore not exposed to the bending moment when the optics tube bends, which may occur during the operation of the endoscope.

The magnet arrangement is preferably formed by a magnet with a ring-shaped embodiment. The latter in particular has a cylindrical embodiment with an internal diameter that is slightly larger than the external diameter of the rod-shaped lens unit in the relevant end section such that a gap for adhesion remains, which is filled with an adhesive in order to affix the magnet arrangement on the rod lens. As a result of this, a rod lens with a particularly effective and easily assembled magnet arrangement is developed.

In accordance with a further preferred embodiment of the invention, the at least one magnet arrangement is arranged in a region which is at a distance from the end of the lens unit and tapered in relation to the end section of the lens unit. In particular, the magnet arrangement and the taper of the lens unit of the rod lens can have such an embodiment that the external diameter of the magnet arrangement is less than or equal to the external diameter of the lens unit in the end section thereof. What this renders possible is to develop a rod lens with a magnet arrangement arranged on the circumferential face thereof; the external diameter of which rod lens is not greater than that of a rod lens without such a magnet arrangement. Since the radial outer edge regions of the lens elements of the rod lens are only even used for image transmission in the end sections of the lens unit as result of the beam path realized in an image carrier of an endoscope, this allows an embodiment in which the cross-sectional area of the rod lens required for the image transmission is not restricted and the installation space available in an optics tube of the endoscope in the radial direction is used in an ideal manner.

The magnet arrangement is preferably formed by a plurality of segments which are each fitted to the e.g. cylindrical lateral face of the lens unit of the rod lens. In a particularly advantageous manner, a magnet arrangement, which is arranged on a region which is spaced from the end of the lens unit and tapered in relation to the end section of the lens unit, is formed by such a plurality of segments. This renders possible a problem-free attachment of the magnet arrangement, in particular on the tapered region of the lens unit, by virtue of the segments being applied individually and adhesively bonded to the circumferential face of the lens unit.

In accordance with a particularly preferred embodiment of the invention, the rod lens has two magnet arrangements spaced from one another, which are respectively arranged in an end section or neighboring an end section of the rod lens. Therefore, the two magnet arrangements are, in particular, arranged on the respective end sections of the lens unit or respectively on a tapered region of the lens unit which neighbors the relevant end section. Therefore, one magnet arrangement is respectively assigned to each of the two ends of the rod lens. The magnet arrangements, which are in each case permanently magnetized in the axial direction, can in this case be polarized in the same or opposite directions. As a result, a rod lens is developed, which enables the construction of a lens system comprising more than two rod lenses, which are mounted adjacent to one another and held displaceably in an optics tube, in which lens system at least part of an axially effective compressive force is absorbed by magnetic repulsive forces acting between the rod lenses adjoining one another or these rod lenses can even be kept at a distance from one another without the use of mechanical spacers. Furthermore, this can simplify the assembly of the lens arrangement since no mechanical spacers are required.

The invention also relates to a relay lens system which serves for imaging an intermediate image in a subsequent intermediate image in the image carrier of a rigid endoscope. Since the subsequent intermediate image is inverted in relation to the preceding one, such a relay lens system is also referred to as an inverting system. An inverting system according to the invention comprises at least two rod lenses which, at least at the ends adjoining one another, are provided in each case with a magnet arrangement, as described above, with the same poles lying opposite one another. In a preferred manner, all rod lenses of the inverting system respectively have one magnet arrangement at each of their two ends. This renders it possible to construct an image carrier of a rigid endoscope without mechanical spacers being required between the rod lenses. This can simplify the assembly of the relay lens system and, for example, avoid vignetting of the endoscopic image.

An endoscope according to the invention, which, in particular, is embodied as a rigid endoscope, comprises a linear lens arrangement which is constructed from lenses following one another in the beam path, along an optical axis. The lens arrangement is arranged in the interior of the endoscope, in particular at least in part in an optics tube of the endoscope, and preferably embodied as an image carrier for transmitting a recorded endoscopic image from a distal to a proximal end of the endoscope. The optics tube is arranged within an elongate shank of the endoscope and can extend into a head of the endoscope. By way of example, the optics tube can be embodied as an internal tube of endoscope optics, which is likewise referred to as an endoscope here, or as a system tube of an endoscope, which may for example comprise work channels for endoscopic instruments or further channels. The endoscope can also comprise illumination optics for transmitting the illumination light generated by an external light source to the distal end of the endoscope.

The lens arrangement comprises at least a first and, arranged adjacent to the first, i.e. directly preceding or succeeding it in the beam path along the optical axis of the endoscope, a second rod lens. According to the invention, the first and the second rod lenses are embodied as described above and arranged in such a way that they face one another with the same magnetic poles such that a magnetic repulsive force acts between the two rod lenses. In particular, in the end regions facing one another or in the tapered regions, adjacent to the end regions, of the respective lens unit, the first and the second rod lenses in each case have an axially magnetized magnet arrangement, wherein the magnet arrangement of the second rod lens is magnetized opposing the one from the first rod lens. This renders it possible for at least part of a compressive force acting between the first and the second rod lenses to be absorbed by the magnetic repulsive force and for a force, with which the first rod lens lies directly, or via a spacer, against the second rod lens, to be reduced and, as a result thereof, for the risk of damage to the rod lenses to be reduced.

In accordance with a preferred embodiment of the invention, the first and the second rod lenses are pretensioned with respect to one another by a compressive force acting on the rod lenses. By way of example, the compressive force can be generated by a system spring, which is arranged on the proximal side and which pretenses the linearly successive optical components of the optical system against a distal termination of the optical system. In particular, the optical components can be guided in an optics tube. The compressive force and the magnetic repulsive force generated by the magnet arrangements, facing one another with the same poles, of the first and of the second rod lenses are set in such a way that the first and the second rod lenses are kept at a distance from one another. Here, it is possible to make use of the fact that the repulsive force rapidly decreases with increasing distance between the magnet arrangements or between the rod lenses, while the compressive force generated by the system spring gradually increases with this distance. Hence, it is possible to select an equilibrium point between these two forces, which corresponds to the desired distance between the end faces of the rod lenses. This renders it possible to keep the rod lenses at a distance from one another, without contact between the end faces thereof and without mechanical spacers being required. The distance or the air gap between the lens units of the first and of the second rod lenses can be very small so as merely to prevent direct contact between the end faces of the two rod lenses. As a result of there being no mechanical contact between the end faces amongst themselves and with a spacer, the risk of damage to the rod lenses and the wear and tear generated during operation of the endoscope can be substantially reduced or practically completely eliminated. Furthermore, the assembly of the lens system can be simplified by dispensing with mechanical spacers and, as a result of the decrease in damage, it is possible to reduce not only the repair outlay when operating the endoscope but also improve the reusability of used rod lenses.

In a particularly preferred manner, the first and the second rod lenses form an inverting system for imaging an intermediate image in a further intermediate image. Here, the ends, facing away from one another, of the first and of the second rod lenses are arranged close to the respective intermediate image, while the end regions facing one another of the rod lenses form the stop part of the inverting system. In this region, it is particularly advantageous for the rod lenses only to have a small air gap between the ends thereof so as to avoid vignetting effects. Mechanical spacers would necessarily cause vignetting, which can only be minimized by accepting a significant installation outlay as a result of very thin and narrow spacers. As a result of the first and the second rod lenses being kept at a distance without a mechanical spacer being required, it is therefore possible to achieve the particular advantage that the mutually opposing end faces of the two rod lenses of the inverting system can be kept at a distance from one another in a simple manner, without vignetting occurring. Mechanical spacers and/or stops can be arranged between a plurality of inverting systems, i.e. in the region of the respective intermediate image, following one another in the lens arrangement.

Furthermore, it is preferable for the lens arrangement of the endoscope to comprise a third rod lens, which is part of a further inverting system and arranged adjacent to the second rod lens. Here, the third rod lens likewise has a magnet arrangement, which is axially magnetized and directed in such a way that the third rod lens and the second rod lens oppose one another with the same poles. What this can achieve is that a distance can also be kept between the inverting system formed by the first and the second rod lenses, and a subsequent further inverting system, without a spacer being necessary, as a result of which the risk of damage to one of the rod lenses is further reduced. In particular, all rod lenses of the lens arrangement of the endoscope can be embodied in this manner.

In accordance with a method according to the invention for assembling an optical system of an endoscope comprising a linear lens arrangement with at least two successive rod lenses, a first rod lens, which comprises at least one axially magnetized magnet arrangement on a circumferential face of a lens unit of the first rod lens, is inserted into an optics tube of the endoscope and a second rod lens, which likewise comprises at least one axially magnetized magnet arrangement on a circumferential face of a lens unit, is then inserted into the optics tube in such a way that the latter lies opposite the first rod lens with the same poles. Here, the first and the second rod lenses are in each case embodied as a preassembled component made of a rod-shaped lens unit, which consists of a lens element or a plurality of lens elements cemented to one another, and at least one axially magnetized magnet arrangement which is affixed on a circumferential face of the lens unit. The first and the second rod lenses preferably form a complete inverting system. Depending on the embodiment of the lens arrangement, provision can be made for further optical elements to be inserted into the optics tube, either before or after inserting the two rod lenses; in particular, it is possible to insert further rod lenses which are embodied and arranged in the same manner as the first and the second one and which in each case form further inverting systems.

In the next step, the rod lenses inserted into the optics tube and, possibly, the further optical elements situated therein are loaded with axial pressure, for example by a system spring with the aid of a system termination guide. The exerted compressive force is increased to such an extent that the rod lenses make contact with one another with the vertexes of the lens units, i.e. the rod lenses are made to abut one another. In the next step, the exerted compressive force is reduced to such an extent, for example by relaxing the system spring, that the rod lenses slightly move apart from one another, for example by a few tenths of a millimeter, under the effect of the repulsive force generated by the opposing magnet arrangements. This is how the distance and hence an air gap is created between the vertexes of the lens units which are now no longer in contact. Optionally, under the effect of the respective magnet arrangements, an air gap can likewise be created in each case between the further rod lenses inserted into the optics tube. The system spring is now fixed in this position such that the rod lenses are in each case kept at a distance from one another in this manner. In a simple and reliable manner, this enables the assembly of a lens arrangement with at least two rod lenses, in which the rod lenses are arranged at a distance from one another, and wherein, at the same time, the risk of damage to the rod lenses during operation is reduced.

It is understood that the features mentioned above and the features yet to be explained below can be used not only in the respectively specified combination but also in other combinations or on their own, without departing from the scope of the present invention.

BRIEF DESCRIPTION OF THE DRAWINGS

Further aspects of the invention emerge from the following description of preferred exemplary embodiments and from the attached drawings. In detail.

DETAILED DESCRIPTION OF THE INVENTION

Figure 1:
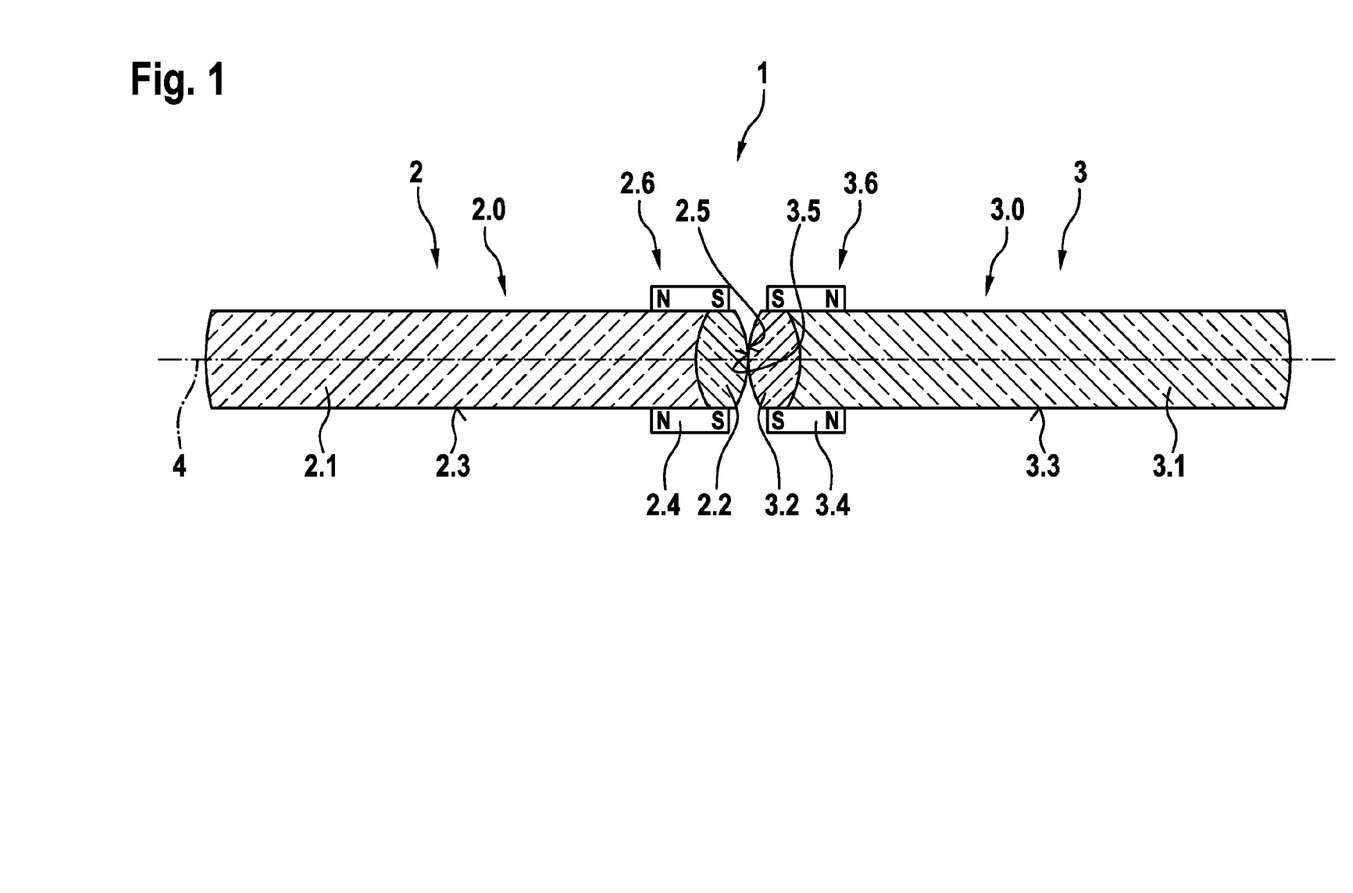
FIG. 1 shows a longitudinal section of an inverting system with two rod lenses embodied in accordance with a first embodiment of the invention.

As depicted in FIG. 1, an inverting system 1 in accordance with a first exemplary embodiment of the invention comprises two rod lenses 2, 3 which are arranged symmetrically with respect to one another and adjoin one another. The rod lenses 2, 3 in each case comprise a lens unit 2.0, 3.0, which in each case consists of a convex-concave elongate rod part 2.1, 3.1 which is cemented to a thin lens 2.2, 3.2. The lens units 2.0, 3.0 are in each case cylindrically off-centered and arranged in such a way that the axes of symmetry thereof coincide with the optical axis 4 of the inverting system 1. Axially permanently magnetized ring magnets 2.4, 3.4 are respectively adhesively bonded to the cylindrical lateral faces 2.3, 3.3 of the lens units 2.0, 3.0 in the end regions which comprise the thin lens 2.2, 3.2 and face one another. To this end, the internal sides of the ring magnets 2.4, 3.4 have a slightly larger diameter than the lateral faces 2.3, 3.3 such that a gap for adhesion remains between the ring magnet 2.4, 3.4 and the lateral face 2.3, 3.3, which gap for adhesion is filled with an adhesive in order to affix the ring magnets 2.4, 3.4. The ring magnets 2.4, 3.4 are magnetized in such a way that they oppose one another with the same poles; in the example shown in FIG. 1, this is the south pole in each case. Overall, the arrangement of the rod lenses 2, 3 including the ring magnets 2.4, 3.4 and the magnetization thereof is symmetrical with respect to a center plane which is perpendicular to the optical axis 4 and lies between the rod lenses 2, 3.

The arrangement of the magnet arrangements 2.6, 3.6, which oppose one another with the same poles and which are formed by the ring magnets 2.4, 3.4, generates a repulsive force between the ring magnets 2.4, 3.4 and therefore also between the rod lenses 2, 3. This repulsive force absorbs at least part of a compressive force, which is exerted from the outside on the rod lenses 2, 3, pretensioning the latter against one another, and renders it possible to keep a distance between the end faces 2.5, 3.5 of the lens units 2.0, 3.0 facing one another when the ring magnets 2.4, 3.4 are designed and arranged accordingly and when the external compressive force is set accordingly. In order to avoid direct contact between the lens units 2.0, 3.0 at the end faces 2.5, 3.5 thereof, and therefore to reduce the risk of damage, a small distance, for example a few tenths of a millimeter, suffices between the vertexes of the end faces 2.5, 3.5 (not depicted in FIG. 1). Therefore, there is no need for a mechanical spacer between the rod lenses 2, 3.

If the inverting system 1 is assembled in an optics tube, the ring magnets 2.4, 3.4 can serve to guide the rod lenses 2, 3 within the optics tube, as a result of which, at the same time, the central regions of the rod lenses 2, 3 are protected against contact by the optics tube, even in the case where the optics tube bends. Ring magnets or else other guide elements (not depicted in FIG. 1) can be arranged accordingly on the other ends of the rod lenses 2, 3.

Figure 2:
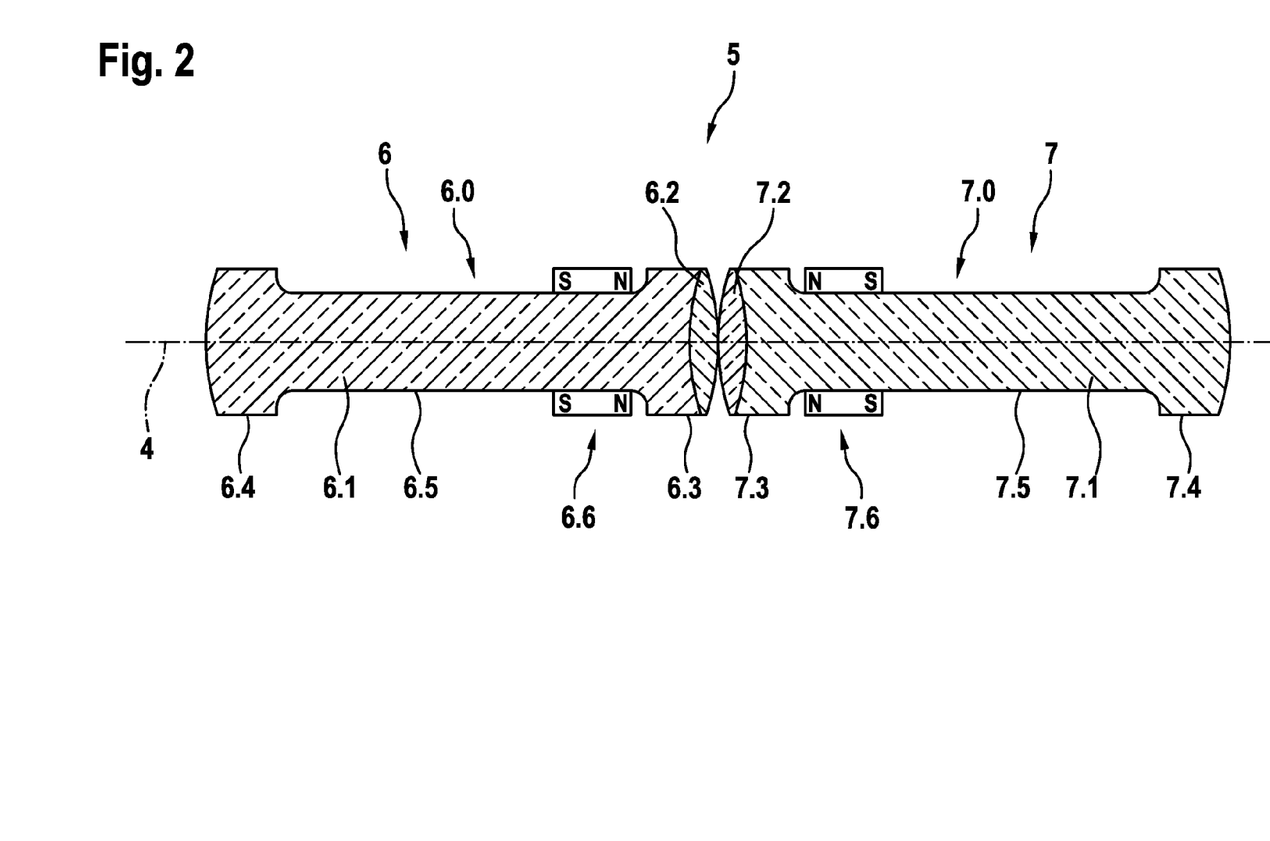
FIG. 2 shows a longitudinal section of an inverting system with two rod lenses in accordance with a second embodiment of the invention.

FIG. 2 shows an inverting system 5 with two rod lenses 6, 7 which are embodied in accordance with the second embodiment of the invention. Similar to what is shown in FIG. 1, the rod lenses 6, 7 in each case comprise a lens unit 6.0, 7.0 with an elongate rod part 6.1, 7.1 and a thin lens 6.2, 7.2 cemented thereto. The lateral face of the lens units 6.0, 7.0 in each case comprises two end regions 6.3, 6.4; 7.3, 7.4 and a central region 6.5, 7.5 which is tapered in terms of diameter with respect to the end regions 6.3, 6.4; 7.3, 7.4. A magnet arrangement 6.6, 7.6 is affixed in each case by adhesive bonding in the region of the tapered regions 6.5, 7.5 neighboring the end regions 6.3, 7.3 facing one another, wherein the same poles of the magnet arrangements 6.6, 7.6—the north pole in the depicted exemplary embodiment—face one another. As explained with respect to FIG. 3, the magnet arrangements 6.6, 7.6 have a segmented design. Overall, the inverting system 5 is symmetrical with respect to a center plane which is perpendicular to the optical axis 4 and lies between the two rod lenses. As explained with respect to FIG. 1, the rod lenses 6, 7 can be held at a distance from one another without mechanical spacers.

As can be identified in FIG. 2, the maximum diameter of the rod lenses 6, 7 is not increased as a result of applying the magnet arrangements in the tapered regions 6.5, 7.5, and so an ideal use of the installation space available within an endoscope or within the optics tube of an endoscope is possible. Here, there likewise is no reduction in the diameter that can be used for image transmission in the bone form of the rod lenses 6, 7 shown in FIG. 2 since this diameter is not completely used in the tapered regions 6.5, 7.5 due to the beam path in an image carrier of a rigid endoscope. Magnet arrangements can likewise be applied in a corresponding manner in the regions of the tapered regions 6.5, 7.5, neighboring the outer end regions 6.4, 7.4, of the lateral faces of the lens units 6.0, 7.0 (not depicted in FIG. 2).

Figure 3:
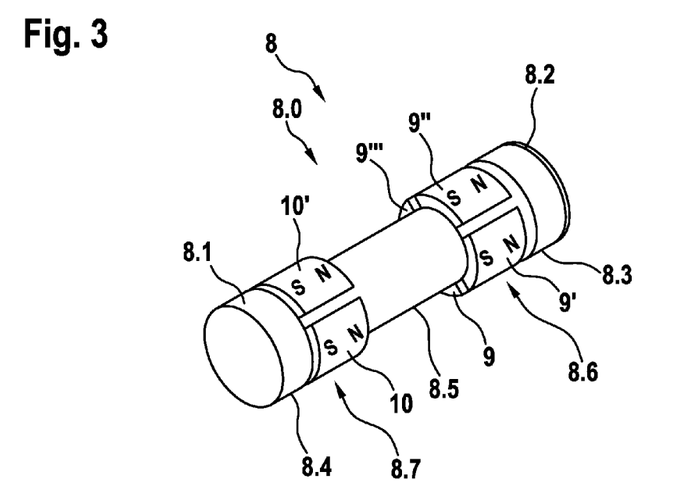
FIG. 3 shows a perspective view of a rod lens in accordance with a third embodiment of the invention.

As shown in the perspective illustration in FIG. 3, the magnet arrangement 8.6 of a rod lens 8 consists of a plurality of segments 9, 9', 9", 9'", which, adjacent to an end region 8.3, are applied distributed along the circumference on the tapered region 8.5 of the lateral face of the lens unit 8.0 of the rod lens 8. On the opposite end of the rod lens 8, adjacent to the end region 8.4, there likewise is a magnet arrangement 8.7, which consists of the segments 10, 10' and further segments which cannot be identified in FIG. 3. By subdividing the magnet arrangements 8.6, 8.7 into a plurality of segments in each case, the application on the tapered region 8.5 is made possible or simplified. Otherwise, the rod lens 8 depicted in FIG. 3 has the same design as the one described in relation to FIG. 2, comprising a rod part 8.1 and a thin lens 8.2, which form the lens unit 8.0.

Figure 4:
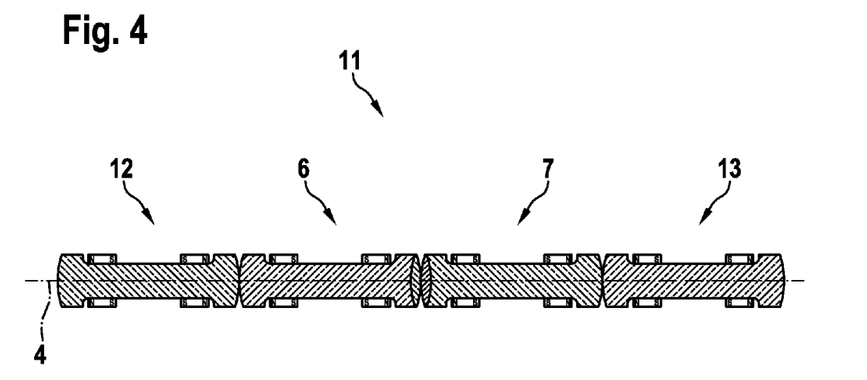
FIG. 4 shows a longitudinal section of part of a lens arrangement of a rigid endoscope.

FIG. 4 shows part of a lens arrangement 11 of an endoscope which lens arrangement 11 comprises a plurality of rod lenses 6, 7, 12, 13 adjoining one another. The rod lenses 6, 7 have a design as described in relation to FIG. 3 and form an inverting system. The lens units of the further rod lenses 12, 13 are in each case formed integrally from merely one biconvex rod part but otherwise have exactly the same design as described in relation to FIG. 3. The rod lenses 12, 13 are parts of further inverting systems not fully depicted in FIG. 4. As can be seen from FIG. 4, the rod lens system overall can have a design which is symmetrical with respect to a center plane. Here, as described above in relation to the rod lenses 6, 7, the further rod lenses 12, 13 are kept at a distance from the respectively adjacent rod lenses 6, 7 by magnetic repulsive forces; this applies correspondingly to further rod lenses of the lens arrangement 11, not depicted in FIG. 4.

Figure 5:
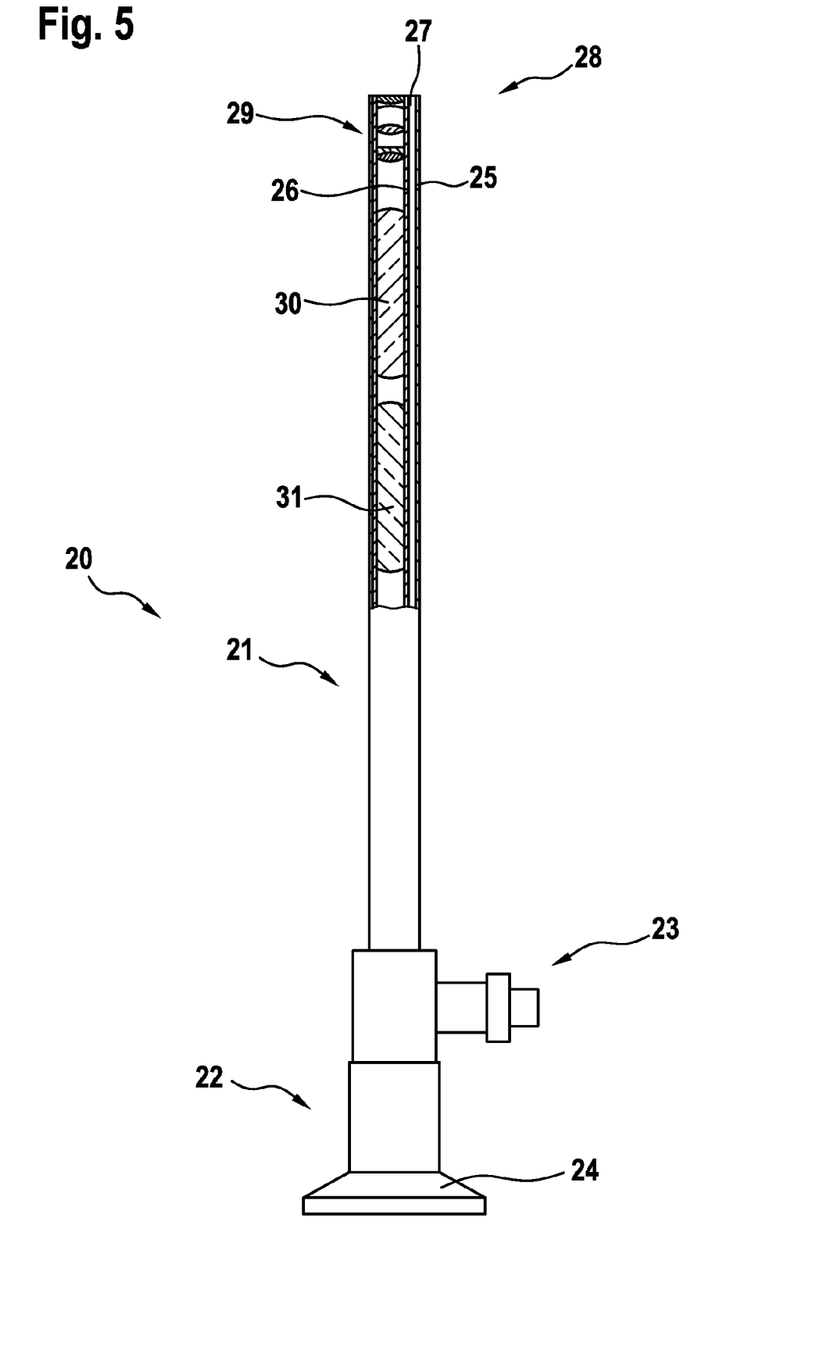
FIG. 5 shows a partly broken-open side view of an endoscope with rod lenses according to the invention

FIG. 5 schematically depicts, in an exemplary manner, a rigid endoscope 20 with rod lenses in accordance with the exemplary embodiments described above. The endoscope 20 comprises an elongate endoscope shank 21 embodied for insertion into a cavity in the interior of the body and an endoscope head 22 arranged at the proximal end of the endoscope shank 21, which endoscope head comprises a light connector 23 and an eyepiece with an eyecup 24. The optics tube 26 and optical waveguides 27 for transmitting the illumination light, coupled in the light connector 23, to the distal end region 28 of the endoscope 20 are arranged within the external tube 25 of the endoscope shank 21. An objective lens arrangement 29 and rod lenses 30, 31, which serve to transmit the endoscopic image cast by the objective lens arrangement 29 from the distal end region 28 to the proximal end region of the endoscope 20, are received in the interior of the optics tube 26. The rod lenses 30, 31 have a design as described in relation to FIGS. 1 to 4 and are not depicted in detail in FIG. 5, wherein the air gaps between the rod lenses 30, 31 and further rod lenses (not shown in FIG. 5) are depicted in a magnified manner for clarification purposes.

Not all reference signs have been depicted in all figures for reasons of clarity. Reference signs not explained with respect to one figure have the same meaning as in the remaining figures.

LIST OF REFERENCE SIGNS

1 Inverting system
2 Rod lens
2.0 Lens unit
2.1 Rod part
2.2 Lens
2.3.1 Lateral face
2.4 Ring magnet
2.5 End face
2.6 Magnet arrangement
3 Rod lens
3.0 Lens unit
3.1 Rod part
3.2 Lens
3.3 Lateral face
3.4 Ring magnet
3.5 End face
3.6 Magnet arrangement
4 Optical axis
5 Inverting system
6 Rod lens
6.0 Lens unit
6.1 Rod part
6.2 Lens
6.3 End region
6.4 End region
6.5 Tapered region
6.6 Magnet arrangement
6.7 Magnet arrangement
7 Rod lens
7.0 Lens unit
7.1 Rod part
7.2 Lens
7.3 End region
7.4 End region
7.5 Tapered region
7.6 Magnet arrangement
8 Rod lens
8.0 Lens unit
8.1 Rod part
8.2 Lens
8.3 End region
8.4 End region
8.5 Tapered region
8.6 Magnet arrangement
8.7 Magnet arrangement
9, 9', 9", 9'" Segment
10, 10' Segment
11 Lens arrangement
12 Rod lens
13 Rod lens
20 Endoscope
21 Endoscope shank
22 Endoscope head
23 Light connector
24 Eyecup
25 External tube
26 Optics tube
27 Optical waveguide
28 Distal end region
29 Objective lens arrangement
30 Rod lens
31 Rod lens

The invention claimed is:

1. A rod lens system comprising
a plurality of rod-shaped lens units each made of a rod-shaped lens element or a plurality of lens elements cemented to one another,
wherein each lens unit comprises at least one axially magnetized magnet arrangement affixed to the circumferential face thereof, the lens units facing one another with the same magnetic poles in order to generate a magnetic repulsive force between adjacent lens units and keep them at a distance from one another.

2. The rod lens system according to claim 1, characterized in that the magnet arrangement is adhesively bonded onto the circumferential face.

3. The rod lens system according to claim 1, characterized in that the magnet arrangement is arranged on an axial end region of the circumferential face.

4. The rod lens system according to claim 1, characterized in that the magnet arrangement is formed by a ring magnet.

5. The rod lens system according to claim 1, characterized in that the magnet arrangement is arranged on a region of the circumferential face which is tapered in relation to an end region.

6. The rod lens system according to claim 1, characterized in that the magnet arrangement is formed by a plurality of segments.

7. The rod lens system according to claim 1, characterized in that a rod-shaped lens unit of the plurality of rod-shaped lens units comprises two magnet arrangements which are respectively arranged on an axial end region of the circumferential face or on the circumferential face, adjacent to an axial end region of the circumferential face.

8. An endoscope with a lens arrangement, which comprises the rod lens system according to claim 1.

9. The endoscope according to claim 8, characterized in that first and the second rod-shaped lens units of the plurality of rod-shaped lens units are pretensioned with respect to one another by a compressive force and in that the compressive force and a magnetic repulsive force acting between the first and the second rod-shaped lens units act against one another in such a way that the first and the second rod-shaped lens units are kept at a distance from one another.

10. The endoscope according to claim 9, characterized in that the first and the second rod-shaped lens units form an inverting system.

11. The endoscope according to claim 10, characterized in that the lens arrangement comprises a third rod-shaped lens unit, which is part of a further inverting system and arranged adjacent to the second rod-shaped lens unit, wherein the third rod-shaped lens unit comprises a magnet arrangement for generating a repulsive force in relation to the second rod-shaped lens unit.

12. A method for assembling an optical system of an endoscope comprising
a lens arrangement with at least a first rod lens and, arranged adjacent to the first rod lens, a second rod lens, wherein the first rod lens, which comprises at least one axially magnetized magnet arrangement affixed to a circumferential face of a lens unit, is inserted into an optics tube of the endoscope,
the second rod lens, which comprises an axially magnetized magnet arrangement affixed to a circumferential face of a lens unit, is inserted into the optics tube in such a way that the magnet arrangements from the first and the second rod lenses oppose one another with the same poles in order to generate a magnetic repulsive force,
the first and the second rod lenses are loaded with axial pressure in such a way that they are in contact with one another with the vertexes of the lens units, and
the first and the second rod lenses are relaxed axially until an air gap is created between the vertexes, in contact with one another, of the lens units of the first and the second rod lenses.

13. The endoscope according to claim 9, characterized in that the compressive force is generated by a system spring arranged at a proximal end of the endoscope.

14. The method according to claim 12, characterized in that the axial pressure is generated by a system spring arranged at a proximal end of the endoscope.

15. The method according to claim 12, characterized in that each lens unit has two end regions and a central region therebetween where its axially magnetized magnet arrangement is arranged, the central region tapered in terms of diameter with respect to the end regions.

16. The method according to claim 12, characterized in that the at least one axially magnetized magnet arrangement comprises a ring magnet.

17. The method according to claim 12, characterized in that the at least one axially magnetized magnet arrangement comprises a plurality of segments.

18. The method according to claim 12, characterized in that the first rod lens comprises two magnet arrangements which are respectively arranged on an axial end region of the circumferential face or on the circumferential face, adjacent to an axial end region of the circumferential face.

19. An endoscope comprising:
a rod lens system having a plurality of rod-shaped lens units each made of a rod-shaped lens element or a plurality of lens elements cemented to one another,
each lens unit having two axially magnetized magnet arrangements affixed to the circumferential face thereof, one adjacent to each end of the lens unit, the lens units facing one another end to end with the same magnetic poles in order to generate a magnetic repulsive force between each pair of lens units,
a system spring arranged at a proximal end of the endoscope generating a compressive force on the lens units so that they are pretensioned with respect to one another by a compressive force, the compressive force and the magnetic repulsive force acting against one another in such a way that the lens units are kept at a distance from one another.

20. The endoscope according to claim 19, characterized in that each lens unit has two end regions and a central region therebetween where its axially magnetized magnet arrangements are arranged, the central region tapered in terms of diameter with respect to the end regions.

* * * * *